May 16, 1933. R. F. PHILLIPS 1,909,890
PORTABLE LIFT
Filed Aug. 12, 1930
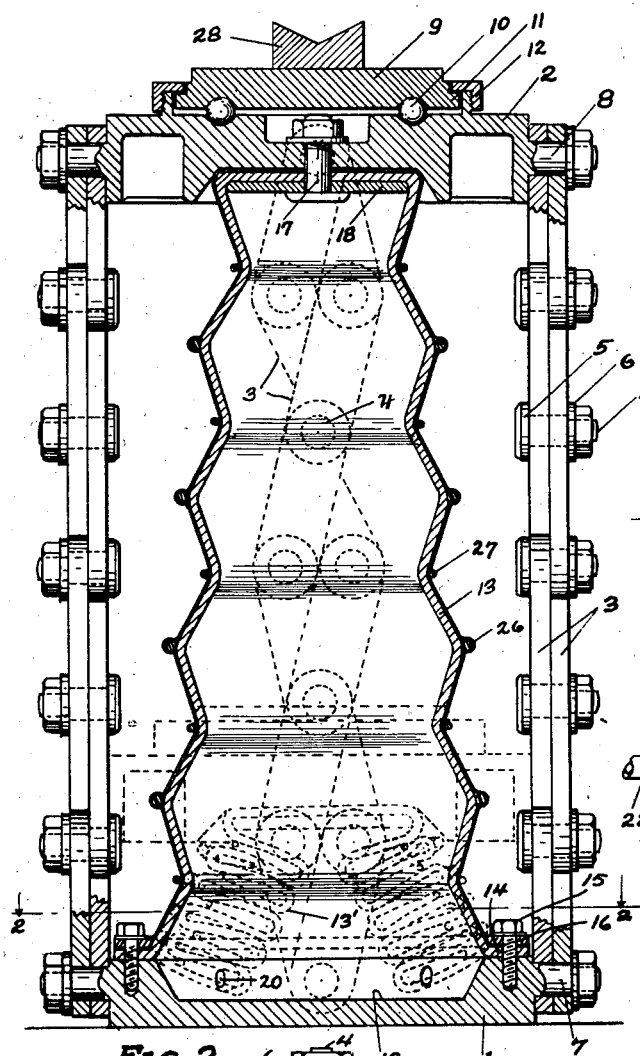
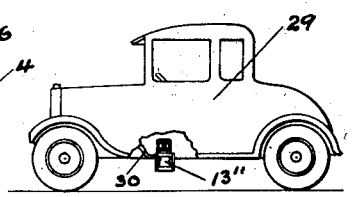
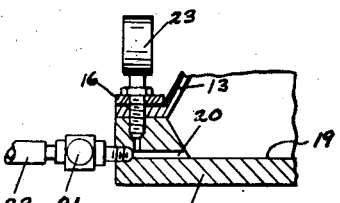
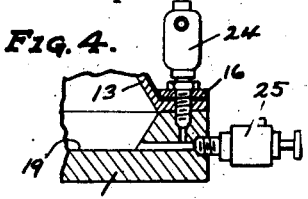
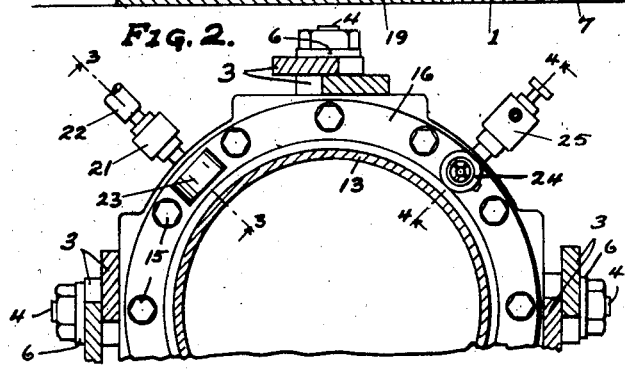
INVENTOR.
Rodney F. Phillips
BY
ATTORNEYS.

Patented May 16, 1933

1,909,890

UNITED STATES PATENT OFFICE

RODNEY F. PHILLIPS, OF OAKLAND, CALIFORNIA

PORTABLE LIFT

Application filed August 12, 1930. Serial No. 474,751.

This invention relates to air hoists or jacks and has for its object a compact portable air jack of relatively great power so as to easily lift an automobile by means of a tire pump, and yet collapse into a comparatively small space when not in use.

In the drawing accompanying this application Fig. 1 is a vertical section of my air jack in extended position.

Fig. 2 is a cross section of Fig. 1 as seen from the line 2—2 thereof.

Fig. 3 is an enlarged sectional elevation of a portion of the jack as seen from the line 3—3 of Fig. 2.

Fig. 4 is an enlarged sectional elevation of a portion of the jack as seen from the line 4—4 of Fig. 2.

Fig. 5 is a side elevation of a portion of an automobile with portion broken away to reveal one of my air jacks secured under and to the chassis so that it is in readiness at any time for use to lift the car.

Briefly described my improved air jack comprises an extendible flexible bellows-like device mounted in an extendible frame. The lower end plate of the frame is provided with an air inlet for compressed air, and the upper end with a revolvable turntable.

In the drawing the extendible frame comprises a base plate 1, head plate 2, and the plates connected at several points around their edges by lazy-tong links or parallel levers 3 pivoted at all joints by shoulder bolts 4 provided with large heads 5 and washers 6 and at their opposite ends to trunnions 7, 8 projecting respectively from the base and head plate to insure free but parallel movement of the head 2 relative to the base.

At the outer end of the head plate 2 is a turntable 9 mounted on an annular row of balls 10 operating in grooved races formed in the confronting surfaces of the turntable and plate 2. The turntable is flanged on its periphery at 11 and prevented from being displaced through means of a collar 12 screwed or otherwise attached to plate 2 and overlapping the flange.

Within the extendible frame described is a flexible bellows-like device 13 preferably constructed of reinforced soft tough rubber similar to thin balloon tire construction but of the form (when extended) of a tapering tube with corrugations extending around it so that when collapsed it will fold upon the corrugations bellows-like as indicated in dotted lines 13' in the drawing.

This flexible rubber bellows is outwardly flanged at 14 at its lower end and secured air-tight to the base 1 by means of bolts 15 passing through a collar 16 and through the flange 14.

The outer end of the bellows is preferably closed and firmly secured within a recess in head plate 2 by one or more bolts as at 17 passing through a heavy washer plate 18 and the end of the bellows.

The base plate 1 is hollowed out as at 19 to receive somewhat the folds of the bellows when collapsed and is provided with an air inlet port 20 closed against inward pressure by a check valve 21 adapted to receive the end of an air hose 22. A pressure gage 23 connecting with the interior of the bellows designates the pressure of air within the bellows, while a safety valve 24 is provided to prevent a dangerous pressure being applied within the bellows, and a blow-off valve 25 provides for letting out the air under gentle control so as to let the car down easily when required.

Through the tapering form of the bellows its folds lie slantingly one within the other and the jack takes up less room than would otherwise be the case, and to prevent bursting of the fabric reinforced rubber I preferably vulcanize a heavy wire ring 26 to the largest diameter of each fold as by overlapping it with the outer membrane of the bellows, while at the small diameters of the folds I provide loose metal rings 27 which cannot become lost or displaced yet effectually support the smaller diameters against bulging outwardly when an air pressure is built up within the bellows.

To insure collapsing of the bellows when the air pressure is let out it is best to mold or vulcanize the rubber bellows in collapsed form or nearly so, so that its normal position is collapsed.

To use the jack it is merely necessary to place it under the article to be lifted and inject compressed air into the bellows through check valve 21 until sufficiently extended.

If desired to use it under an axle of an auto a V block as at 28 may be placed on the turntable.

A particular application of my air jack is to raise a car bodily so that it may be revolved on the turntable, and to this end I sometimes mount the jack permanently under the car frame as shown in Fig. 5 wherein the car 29 has the jack 13'' secured to it in inverted position and is provided with an air hose 30 leading to any source of compressed air either carried in a tank on the car or power or hand pump not shown in the drawing.

With the complete arrangement of my jack as shown in Fig. 5 a car may be parked in congested places with great ease, as it is merely necessary to force the jack against the ground to lift the car, spin the car around to any required point, drop it, and roll to place.

Having thus described my improved air jack or hoist what I claim is:—

1. A jack comprising base and end members arranged so as to be movable toward and from one another, a bellows positioned between said members, and means for admitting gas under pressure to the bellows for forcing said members apart, said bellows being of conical form so that it will fold compactly in collapsing, and one of said members hollowed out to partially receive the bellows folds when collapsed.

2. A jack comprising base and end plates, pivoted links connecting said plates arranged to permit bodily movement of the plates toward and away from one another, a bellows positioned between said plates, and means for admitting gas under pressure to said bellows.

3. A jack comprising base and end plates, pivoted lazy-tong links connecting said plates arranged to permit bodily movement of the plates toward and away from one another, a bellows positioned between said plates, and means for admitting gas under pressure to said bellows, and a relief valve to prevent over inflation.

4. A jack comprising base and end plates, pivoted links connecting said plates arranged to permit bodily movement of the plates toward and away from one another, an expansible chamber between said plates, and means for admitting gas under pressure to said expansible chamber.

RODNEY F. PHILLIPS.